United States Patent
Wang

(10) Patent No.: US 11,367,912 B1
(45) Date of Patent: Jun. 21, 2022

(54) RECHARGEABLE LITHIUM BATTERY APPARATUS WITH CYLINDRICAL BATTERY

(71) Applicant: SHENZHEN ORIENTAL WILLING NEW ENERGY CO., LTD, Guangdong (CN)

(72) Inventor: Kunli Wang, Guangdong (CN)

(73) Assignee: SHENZHEN ORIENTAL WILLING NEW ENERGY CO., LTD, Guangdong (CN)

( * ) Notice: Subject to any disclaimer, the term of this patent is extended or adjusted under 35 U.S.C. 154(b) by 0 days.

(21) Appl. No.: 17/540,935

(22) Filed: Dec. 2, 2021

Related U.S. Application Data

(63) Continuation of application No. PCT/CN2021/128338, filed on Nov. 3, 2021.

(30) Foreign Application Priority Data

Aug. 30, 2021 (CN) .......................... 202111003867.9

(51) Int. Cl.
*H01M 50/107* (2021.01)
*H01M 50/566* (2021.01)
*H01M 50/198* (2021.01)
*H01M 50/533* (2021.01)
*H01M 10/42* (2006.01)
*H01M 10/0525* (2010.01)

(52) U.S. Cl.
CPC ....... *H01M 50/107* (2021.01); *H01M 10/425* (2013.01); *H01M 50/198* (2021.01); *H01M 50/533* (2021.01); *H01M 50/566* (2021.01); *H01M 10/0525* (2013.01)

(58) Field of Classification Search
CPC ............. H01M 50/107; H01M 10/425; H01M 50/198; H01M 50/533; H01M 50/566; H01M 10/0525
USPC ........................................................ 429/164
See application file for complete search history.

(56) References Cited

U.S. PATENT DOCUMENTS

2020/0161713 A1* 5/2020 Qin ................... H01M 10/4257

FOREIGN PATENT DOCUMENTS

| CN | 106486693 A | 3/2017 |
|---|---|---|
| CN | 208862043 U | 5/2019 |
| KR | 20050113984 A | 12/2005 |

* cited by examiner

*Primary Examiner* — Gary D Harris
(74) *Attorney, Agent, or Firm* — Muncy, Geissler, Olds & Lowe, P.C.

(57) ABSTRACT

The present application discloses a rechargeable lithium battery apparatus, comprising a battery cell in a cylindrical shape, a positive electrode of the battery cell has a protection circuit board arranged, wherein, between the positive electrode of the battery cell in the cylindrical shape and a positive electrode of the protection circuit board, there is a metal screw connection structure arranged, acting as the positive electrode of the protection circuit board, connecting electrically to the positive electrode of the battery cell. The rechargeable lithium battery apparatus of the present application, due to adopting a metal screw connection structure arranged on a circuit board at the positive electrode of the battery, corresponding to the positive electrode of the battery cell, achieves a positive electrode cap and a solid connection between the protection circuit board and the battery cell, forming a brand new lithium battery apparatus.

9 Claims, 3 Drawing Sheets

RECHARGEABLE LITHIUM BATTERY APPARATUS WITH CYLINDRICAL BATTERY

CROSS-REFERENCE TO RELATED APPLICATIONS

This application is a bypass continuation application of PCT application No. PCT/CN2021/128338 filed on Nov. 3, 2021, which claims priority to Chinese patent application No. 202111003867.9 filed on Aug. 30, 2021, the contents of each of the above application are hereby incorporated by reference.

FIELD OF THE INVENTION

The present application relates to the technical field of improving a rechargeable lithium battery apparatus, in particular to a positive structure improvement of a rechargeable lithium battery.

BACKGROUND

A rechargeable lithium battery apparatus in the prior art, especially a daily used model of 18650, in which a battery cell been used has already been popular and common in an industrial production. For example, in a rechargeable battery of an electric vehicle, there are a large number of battery cells of the model of 18650 commonly used.

Therefore, this type of battery cells is able to make up a battery of the model 18650, which is commonly used by an ordinary consumer. This model of battery is a cylindrical battery. A positive electrode thereof has usually a control circuit arranged, connecting both the positive electrode and a negative electrode of the battery, to achieve a control and management to the protection circuit board, including a safety, an overcharging prevention and more.

The rechargeable lithium battery in the prior art is usually arranging two separate ends as a positive electrode and a negative electrode when in use. The positive electrode has a contact cap protruding at a center, and on the negative electrode, there is usually a flat metal plate, forming the negative electrode of the battery.

However, the rechargeable lithium battery in the prior art, not limited to the model of 18650, all has a plurality of safety requirements, that is, preventing a short circuit conduction between the positive electrode and the negative electrode, also it is necessary to ensure an assembly stability of the protection circuit board, to prevent the battery from being possibly deformed or damaged when dropping, thus causing a damage to a function of the battery.

Therefore, the current technology still has a plurality of defects, and needs to be improved and developed.

BRIEF SUMMARY OF THE DISCLOSURE

According to the defects in the prior art described above, the present application provides a rechargeable lithium battery apparatus, applied to providing a lithium battery apparatus having a solid positive electrode structure.

The technical solution of the present application to solve the technical problems is as follows:

a rechargeable lithium battery apparatus, comprising a battery cell in a cylindrical shape, a positive electrode of the battery cell has a Protection circuit board arranged; wherein, between the positive electrode of the battery cell in the cylindrical shape and a positive electrode of the Protection circuit board, a metal screw connection structure is arranged; acting as the positive electrode of the Protection circuit board, the metal screw connection structure connects electrically to the positive electrode of the battery cell.

The rechargeable lithium battery apparatus, wherein an arrangement of the metal screw connection structure comprises a first metal connection piece, welded and fixed to the positive electrode of the Protection circuit board; and a second metal connection piece, welded and fixed to the positive electrode of the battery cell; the first metal connection piece and the second metal connection piece have a thread arranged matching each other correspondingly, being able to be screwed together.

The rechargeable lithium battery apparatus, wherein the first metal connection piece is a nut having an internal thread; the second metal connection piece is a bolt having an external thread.

The rechargeable lithium battery apparatus, wherein the second metal connection piece further comprises a metal circular plate arranged below the bolt, applied to welding and fixing a terminal surface of the positive electrode of the battery cell.

The rechargeable lithium battery apparatus, wherein a negative electrode of the protection circuit board is arranged on a side of the Protection circuit board facing the battery cell and at a position near an edge, while electrically connecting to a negative electrode area around a front end of the battery cell through a metal conductor.

The rechargeable lithium battery apparatus, wherein the metal conductor is achieved by a spring welded and fixed on the protection circuit board.

The rechargeable lithium battery apparatus, wherein a plurality of insulating sheets are arranged between the positive electrode and the negative electrode at the front end of the battery cell and the protection circuit board.

The rechargeable lithium battery apparatus, wherein an insulating glue is arranged and filled between the positive electrode and the negative electrode at the front end of the battery cell and the protection circuit board.

The rechargeable lithium battery apparatus, wherein a steel cylinder is further arranged outside the battery cell and the protection circuit board, applied to sheathing and accommodating the battery cell and the protection circuit board.

The rechargeable lithium battery apparatus, wherein a cylinder body length of the steel cylinder is consistent with a combination length of the battery cell and the protection circuit board, and a blocking wall is arranged on an end side of the positive electrode; between the steel cylinder and an outer wall of the battery cell, an insulating adhesive film is arranged.

The present application provides a rechargeable lithium battery apparatus, due to adopting the metal screw connection structure arranged on a circuit board at the positive electrode of the battery, corresponding to the positive electrode of the battery cell, achieves a positive electrode cap and a solid connection between the protection circuit board and the battery cell, forming a brand new lithium battery apparatus.

DETAILED DESCRIPTION OF EMBODIMENTS

In order to make the purpose, technical solution and the advantages of the present application clearer and more explicit, further detailed descriptions of the present application are stated herein, referencing to the attached drawings and some embodiments of the present application. It should be understood that the detailed embodiments of the application described here are used to explain the present application only, instead of limiting the present application.

The present application discloses a plurality of embodiments of a rechargeable lithium battery apparatus, especially for a lithium battery apparatus in a cylindrical shape, such as a rechargeable lithium battery of a model of 18650. An embodiment of the present application, shown as FIG. 1, wherein a battery cell 110 in a cylindrical shape is first arranged, which is usually a standard industrial product, a front end thereof is a positive terminal and a back end is a negative terminal. However, during a production process of the battery cell, an outer peripheral wall and the negative terminal are integrated into a metal cylinder, therefore, the front end of the battery cell is usually arranged as a platform 111 raised from a center position, becoming the positive terminal, while a periphery and an outer wall are both conducted with the negative terminal, therefore, on the front end of the battery cell, an area of an insulating glue is preset between the platform of the positive electrode at a center and a negative electrode area 112 at the peripheral, applied to isolating a positive electrode and a negative electrode of the battery to prevent a short circuit.

Figure 1:
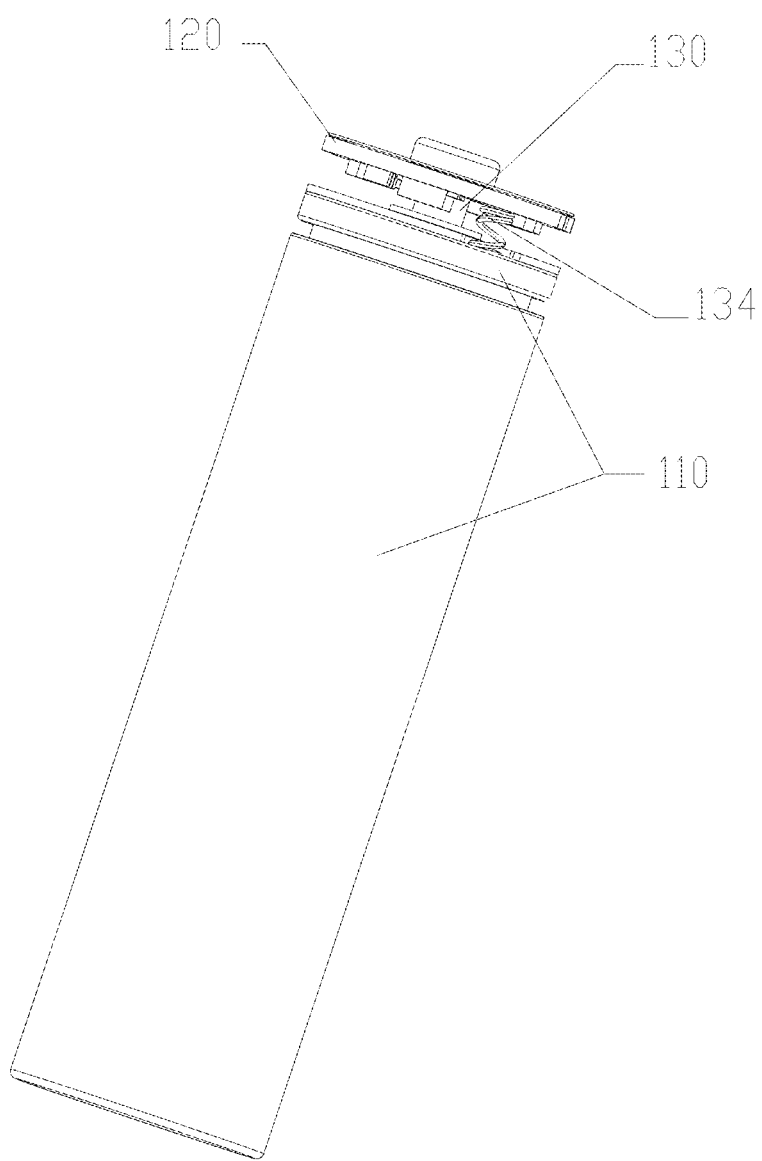
FIG. 1 illustrates a schematic diagram on an internal structure of an embodiment of the rechargeable lithium battery apparatus in the present application.
Figure 2:
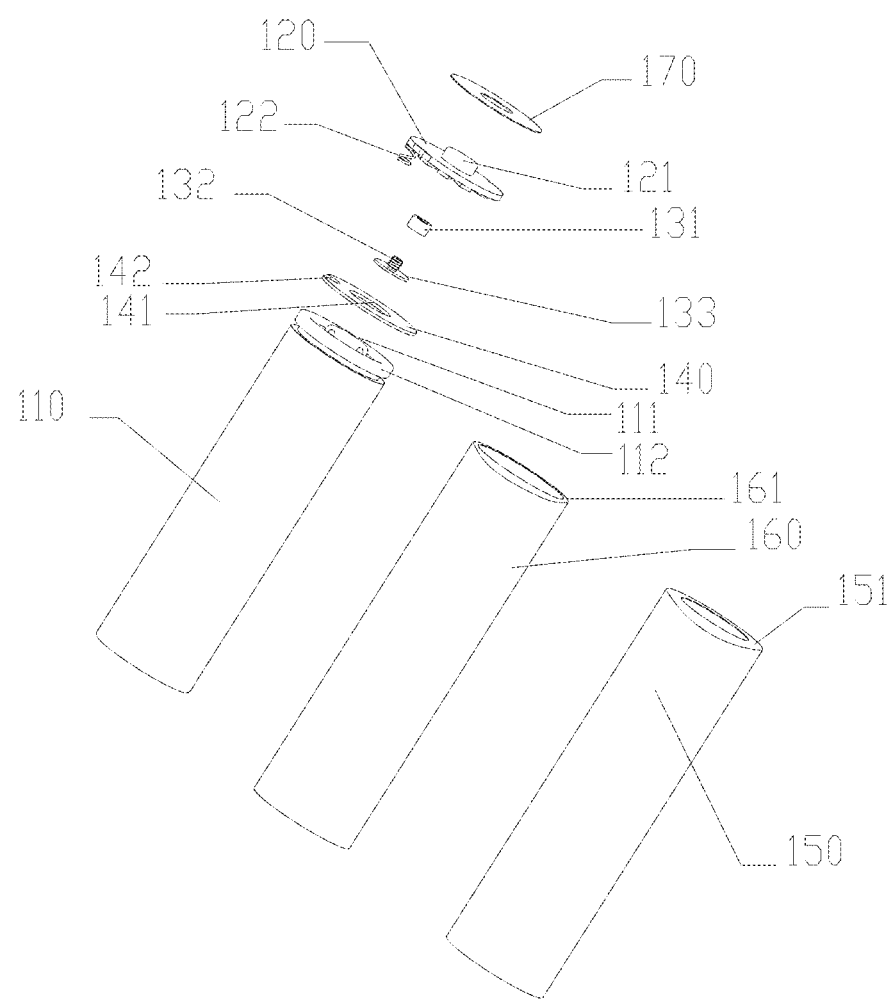
FIG. 2 illustrates an exploded schematic diagram on an embodiment of the rechargeable lithium battery apparatus in the present application.

An embodiment of the rechargeable lithium battery apparatus disclosed by the present application, wherein the positive electrode of the battery cell further requires a protection circuit board 120 arranged, shown as FIG. 1 and FIG. 2, the protection circuit board 120 itself has a management and control circuit arranged for the battery cell of the lithium battery, applied to ensuring a safety in a charging and discharging process, preventing an overcharging, and more. An assembly side of a plurality of circuit components thereof is a side facing the positive electrode of the battery cell. The protection circuit board 120 shall perform a current management during the charging and discharging process of the battery cell, thus the protection circuit board 120 itself has a positive electrode contact point and a negative electrode contact point, requiring an arrangement of connecting to the positive electrode and the negative electrode of the battery cell. Through a connection with the protection circuit board 120, another side of the protection circuit board 120 has a positive electrode protrusion 121 arranged, as the positive electrode of the battery in a whole (usually a positive electrode cap is arranged).

Between the positive electrode of the battery cell 110 in the cylindrical shape and the positive electrode of the protection circuit board 120 in an embodiment of the present application, a metal screw connection structure 130 is arranged, that is, the positive electrode contact point of the protection circuit board 120 is arranged in a center, corresponding to a central position on a terminal surface of the positive electrode of the battery cell 110. While the negative electrode contact point of the protection circuit board 120 is arranged on an edge, corresponding to a peripheral position on the terminal surface of the positive electrode of the battery cell 110. The metal screw connection structure simultaneously serves as a structure for a conductive connection between the positive electrode of the protection circuit board and the positive electrode of the battery cell.

Through the metal screw connection structure, it is possible to achieve a firm fixation and assembling between the protection circuit board 120 and the positive electrode of the battery cell 110, while achieving a conduction function of the positive electrode at the same time. When assembling, it is only needed to screw the protection circuit board to a predetermined angle and reach a certain tightness, which facilitates an automatic assembly, while an assembled lithium battery is firm and durable.

Figure 3:
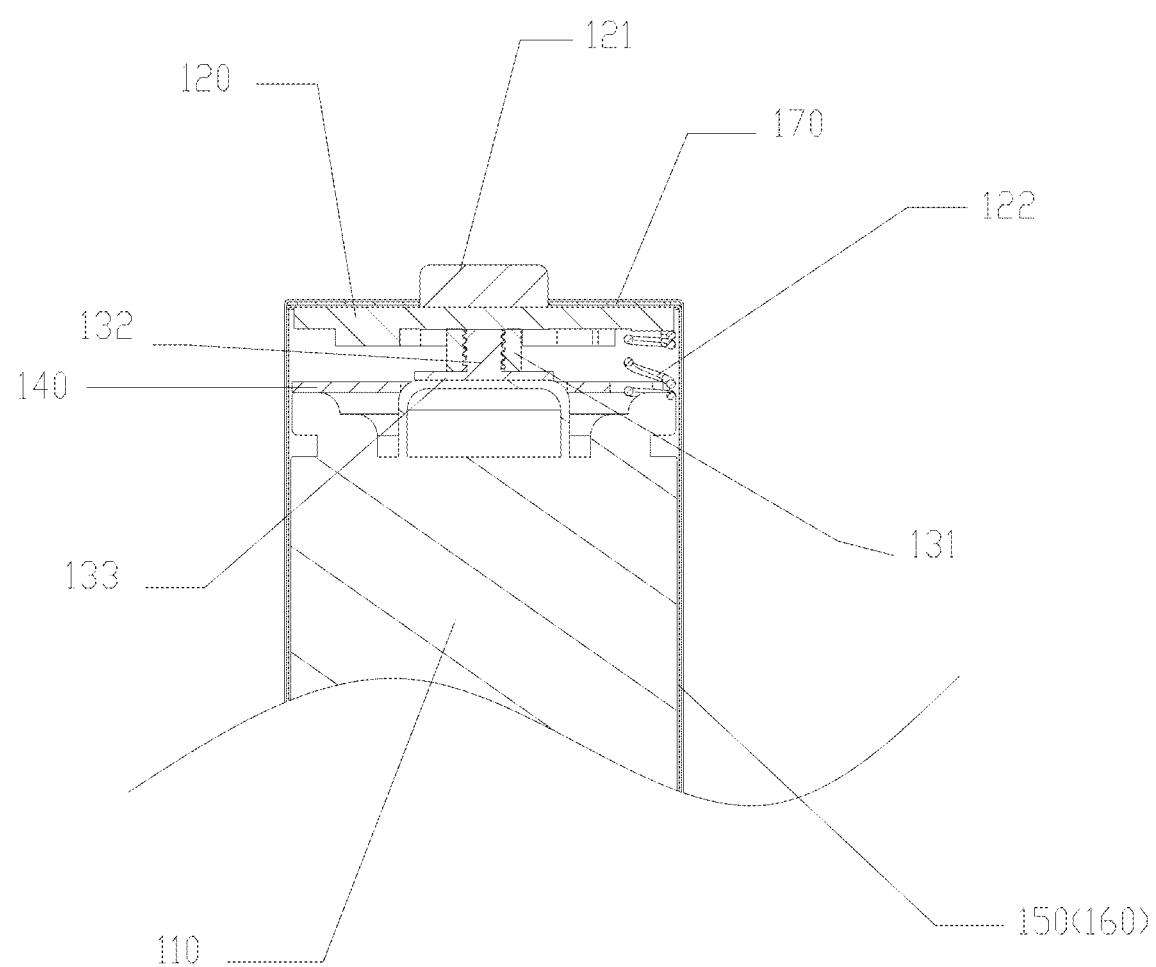
FIG. 3 illustrates a cross-sectional view on an embodiment of the rechargeable lithium battery apparatus in the present application.

Further, an embodiment of the rechargeable lithium battery apparatus of the present application, wherein the metal screw connection structure further comprises a first metal connection piece 131, shown as FIG. 2 and FIG. 3, which may be welded and fixed in advance to a position of the positive electrode contact point at the center of the protection circuit board 120, while an internal thread or an external thread (the FIG. shows the internal thread) is arranged on the first metal connection piece 131. And a second metal connection piece 132, may be welded and fixed in advance to a position of a positive electrode boss of the battery cell 110, shown as FIG. 2 or FIG. 3, having an external thread or an internal thread (the FIG. shows the external thread) corresponding to the first metal connection piece 131, so that an assembly with the battery cell 110 may be achieved by rotating the protection circuit board 120, while ensuring that the positive electrode is connected and conducted.

An embodiment, wherein the first metal connection piece 131 of the present application may be adopted as a nut, while the second metal connection piece 132 may be adopted as a bolt correspondingly; or, may be in an opposite arrangement, which is not repeated herein. The first metal connection piece 131 and the second metal connection piece 132 may be, but not limited to, arranged as and made of a copper material having a good electrical conductivity.

At a bottom of the second metal connection piece 132, a metal circular plate 133 is further adopted and arranged, the metal circular plate 133 is arranged at a bottom of the bolt, which enlarges an area used for welding and fixing, so as to achieve a more solid fixation when welding to the positive electrode boss of the battery cell 110. A size of the metal circular plate 133 may be arranged to correspond to a size of the platform 111 at the positive electrode of the battery cell 110, thereby ensuring not only a reliability of the welding and fixation, but also a quality performance of a product.

An embodiment of the rechargeable lithium battery apparatus disclosed by the present application, wherein at a peripheral edge position of the protection circuit board 120, on a side facing the positive electrode of the battery cell, a negative electrode contact point is arranged, and a metal conductor 122 is arranged at the negative electrode contact point, including a nickel strip, a wire or any other metal materials, a lower end thereof touches and contacts a negative electrode area around a front end of the battery cell, thereby forming a negative electrode conduction.

An embodiment, wherein the metal conductor 122 may be achieved by adopting a spring 134 welded and fixed on the protection circuit board in advance. Since the spring has a certain elasticity, it can be arranged as having a slightly longer original length than a gap between the protection circuit board and the front end of the battery cell, so that the spring is ensured to be compressed between the negative electrode of the battery cell and the protection circuit board after an assembly, to ensure a conduction and connection of the negative electrode. The spring is made of a copper material.

The spring may be arranged as adopting more than one, for example two or three or more springs are distributed symmetrically along a periphery of the protection circuit board, and at least one of the springs may be arranged as connecting to the negative electrode of the protection circuit board. For a plurality of necessary cases, it is possible to arrange multiple springs to connect the negative electrode of the battery cell in parallel. Thus the multiple springs can not only ensure a stability of the protection circuit board after the assembly, but also ensure the conduction with the negative electrode in multiple ways. A parallel connection of the plurality of conductions can further reduce an internal resistance of a protection circuit, that is, an internal resistance of the lithium battery apparatus in a whole.

The lithium battery and the battery cell apparatus thereof, since the positive electrode is surrounded by the negative electrode, both are locating on one end surface, thus a danger of the lithium battery often happened is that an insulation performance is not enough, or the insulation performance is reduced after a collision or a falling, causing a short circuit to occur. Therefore, the rechargeable lithium battery apparatus of the present application, wherein an insulating structure is required to be arranged between the positive electrode, the negative electrode and the protection circuit board of the battery cell. Shown as FIG. 2 and FIG. 3, a method of an insulating sheet 140 is adopted, the insulating sheet has a first hole portion 141 arranged at a center, allowing the metal screw connection structure from the positive electrode to pass through, and a second hole portion 142 arranged at an edge, allowing the metal conductor from the negative electrode to pass through, which may form a semicircular shape or have a certain opening near the edge specifically. For a convenience of processing and assembly, especially for a convenience of an industrial automation assembly, an embodiment of the present application, a method may further be adopted to process by injecting insulating glue into a space stated above where insulation is required.

An embodiment of the rechargeable lithium battery apparatus disclosed by the present application, wherein outside an integral assembly structure of the battery cell 110 and the protection circuit board 120, a steel cylinder 150 may be arranged to perform an enforcement and a protection to a structure of the lithium battery in an integral, also a blocking wall 151 may be arranged at a front end of the steel cylinder 150, to assemble an entire assembly structure into the steel cylinder 150 from back to front, so the steel cylinder 150 sheaths and accommodates the battery cell 110 and the protection circuit board 120.

In order to prevent the negative electrode of the lithium battery apparatus from being exposed too close to the positive electrode, an insulating adhesive film 160 is further arranged between an inner side of the steel cylinder 150 and the outer wall of the battery cell. The insulating adhesive film 160 can perfectly expose the negative electrode of the battery cell 110 in a whole to a back end of the battery only, while exposing the positive electrode to the front end only (the front end also has an extending edge 161 arranged covering the negative electrode area around a front terminal surface of the battery cell). In such a way, a safety of the battery as a whole can be further improved. On an outer side of the protection circuit board 120, a shielding plate 170 is arranged for a packaging aesthetics and insulation, wherein a center thereof has a corresponding hole for exposing the positive electrode protrusion 121 of the protection circuit board 120.

The embodiments of the rechargeable lithium battery apparatus in the present application, wherein after adopting the assembly structure mentioned above, it is not only convenient for an industrialized processing and assembly, but also improving a reliability after the assembly, and the internal resistance of the battery after passing through the protection circuit board is declined obviously, compared to that in the prior art, thus an additional loss and a heat generation of the battery in use also decrease. Therefore, the lithium battery apparatus in a whole is not only safe, but also has a longer service life.

It should be understood that, the application of the present application is not limited to the above examples listed. Ordinary technical personnel in this field can improve or change the applications according to the above descriptions, all of these improvements and transforms should belong to the scope of protection in the appended claims of the present application.

What is claimed is:

1. A rechargeable lithium battery apparatus, comprising a battery cell in a cylindrical shape, a positive electrode of the battery cell has a protection circuit board arranged; wherein, between the positive electrode of the battery cell in the cylindrical shape and a positive electrode of the protection circuit board, a metal screw connection structure is arranged; acting as the positive electrode of the protection circuit board, the metal screw connection structure connects electrically to the positive electrode of the battery cell, wherein an arrangement of the metal screw connection structure comprises a first metal connection piece, welded and fixed to the positive electrode of the protection circuit board; and a second metal connection piece, welded and fixed to the positive electrode of the battery cell; the first metal connection piece and the second metal connection piece have a thread arranged matching each other correspondingly, being able to be screwed together.

2. The rechargeable lithium battery apparatus according to claim 1, wherein the first metal connection piece is a nut having an internal thread; the second metal connection piece is a bolt having an external thread.

3. The rechargeable lithium battery apparatus according to claim 2, wherein the second metal connection piece further comprises a metal circular plate arranged below the bolt, applied to welding and fixing a terminal surface of the positive electrode of the battery cell.

4. The rechargeable lithium battery apparatus according to claim 1, wherein a negative electrode of the protection circuit board is arranged on a side of the protection circuit board facing the battery cell and at a position near an edge, while electrically connecting to a negative electrode area around a front end of the battery cell through a metal conductor.

5. The rechargeable lithium battery apparatus according to claim 4, wherein the metal conductor is achieved by a spring welded and fixed on the protection circuit board.

6. The rechargeable lithium battery apparatus according to claim 5, wherein a plurality of insulating sheets are arranged between the positive electrode and the negative electrode at the front end of the battery cell and the protection circuit board.

7. The rechargeable lithium battery apparatus according to claim 6, wherein an insulating glue is arranged and filled between the positive electrode and the negative electrode at the front end of the battery cell and the protection circuit board.

8. The rechargeable lithium battery apparatus according to claim 7, wherein a steel cylinder is further arranged outside the battery cell and the protection circuit board, applied to sheathing and accommodating the battery cell and the protection circuit board.

9. The rechargeable lithium battery apparatus according to claim 8, wherein a cylinder body length of the steel cylinder is consistent with a combination length of the battery cell and the protection circuit board, and a blocking wall is arranged on an end side of the positive electrode; between the steel cylinder and an outer wall of the battery cell, an insulating adhesive film is arranged.

* * * * *